US008051249B2

(12) United States Patent
Mosek et al.

(10) Patent No.: US 8,051,249 B2
(45) Date of Patent: Nov. 1, 2011

(54) METHOD FOR PRELOADING DATA TO IMPROVE DATA-RETRIEVAL TIMES

(75) Inventors: Amir Mosek, Tel Aviv (IL); Amir Lehr, Hod Hasharon (IL); Yacov Duzly, Ra'Anana (IL); Menahem Lasser, Kohav Yair (IL)

(73) Assignee: Sandisk IL Ltd., Kfar Saba (IL)

( * ) Notice: Subject to any disclaimer, the term of this patent is extended or adjusted under 35 U.S.C. 154(b) by 305 days.

(21) Appl. No.: 11/802,224

(22) Filed: May 21, 2007

(65) Prior Publication Data

US 2007/0276990 A1    Nov. 29, 2007

Related U.S. Application Data

(60) Provisional application No. 60/803,371, filed on May 29, 2006.

(51) Int. Cl.
    *G06F 12/00*    (2006.01)
(52) U.S. Cl. .. 711/137; 711/213; 711/204; 711/E12.088
(58) Field of Classification Search .................. 711/213, 711/E12.057
    See application file for complete search history.

(56) References Cited

U.S. PATENT DOCUMENTS

| 5,410,653 | A |   | 4/1995  | Macon, Jr. et al. |         |
|-----------|---|---|---------|-------------------|---------|
| 5,530,821 | A | * | 6/1996  | Miyamoto          | 711/203 |
| 5,941,981 | A | * | 8/1999  | Tran              | 712/207 |
| 6,003,115 | A |   | 12/1999 | Spear et al.      |         |
| 6,044,439 | A |   | 3/2000  | Ballard et al.    |         |
| 6,134,643 | A | * | 10/2000 | Kedem et al.      | 711/213 |
| 6,418,525 | B1|   | 7/2002  | Charney et al.    |         |
| 6,463,509 | B1| * | 10/2002 | Teoman et al.     | 711/137 |
| 6,516,389 | B1|   | 2/2003  | Uchihori          |         |
| 6,625,696 | B1| * | 9/2003  | Willke, II        | 711/137 |
| 6,654,867 | B2| * | 11/2003 | Wilson et al.     | 711/213 |
| 6,834,325 | B1|   | 12/2004 | Milillo et al.    |         |

(Continued)

FOREIGN PATENT DOCUMENTS

TW            454146 B         9/2001

OTHER PUBLICATIONS

International Search Report, International Application No. PCT/IL2007/000645, dated Oct. 2, 2007, 12 pages.

(Continued)

*Primary Examiner* — Reginald Bragdon
*Assistant Examiner* — Arvind Talukdar
(74) *Attorney, Agent, or Firm* — Toler Law Group

(57) ABSTRACT

The present invention discloses methods for improving data-retrieval times from a non-volatile storage device. A method for preloading data to improve data-retrieval times from a non-volatile storage device, the method including the steps of: providing a cache memory for preloading the data upon a host-system request to read the data; determining that a plurality of data segments that constitute a non-contiguous data object, stored in the storage device such that at least one data segment is non-contiguous to a preceding data segment in the data object, are in a predictable sequence; and preloading a non-contiguous next data segment in the predictable sequence into the cache memory after loading a current data segment into a host system from the cache memory, wherein the next data segment is preloaded prior to the host-system request to read the next data segment.

21 Claims, 7 Drawing Sheets

U.S. PATENT DOCUMENTS

| | | | |
|---|---|---|---|
| 7,313,656 B1* | 12/2007 | Harvey | 711/137 |
| 2003/0105939 A1* | 6/2003 | Cooksey et al. | 711/203 |
| 2003/0208660 A1* | 11/2003 | van de Waerdt | 711/137 |
| 2004/0088490 A1* | 5/2004 | Ghosh | 711/137 |
| 2004/0148593 A1* | 7/2004 | Civlin | 717/154 |
| 2004/0168026 A1* | 8/2004 | Wu et al. | 711/118 |
| 2004/0205298 A1* | 10/2004 | Bearden et al. | 711/137 |
| 2004/0205301 A1* | 10/2004 | Hara et al. | 711/137 |
| 2005/0210198 A1* | 9/2005 | Dimpsey et al. | 711/137 |
| 2006/0026386 A1* | 2/2006 | Freedman et al. | 711/213 |
| 2007/0136533 A1* | 6/2007 | Church et al. | 711/137 |
| 2007/0143547 A1* | 6/2007 | Farmer et al. | 711/137 |
| 2007/0150647 A1* | 6/2007 | Shin et al. | 711/103 |
| 2007/0198780 A1* | 8/2007 | Boyd et al. | 711/137 |
| 2007/0204108 A1* | 8/2007 | Griswell et al. | 711/137 |

OTHER PUBLICATIONS

Office Action dated Jan. 18, 2011, issued in Taiwan Application No. 096119012 with English translation, 12 pages.

* cited by examiner

METHOD FOR PRELOADING DATA TO IMPROVE DATA-RETRIEVAL TIMES

RELATED APPLICATIONS

This patent application claims priority under 35 U.S.C. §119(e) to U.S. Provisional Application No. 60/803,371, filed May 29, 2006, which is hereby incorporated by reference in its entirety.

This patent application is related to U.S. patent application Ser. No. 11/802,223 of the same inventors, which is entitled "PREDICTIVE DATA-LOADER" and filed on the same day as the present application now abandoned. This patent application, also claiming priority to U.S. Provisional Application No. 60/803,371, is incorporated in its entirety as if fully set forth herein.

FIELD AND BACKGROUND OF THE INVENTION

The present invention relates to methods for improving data-retrieval times from a non-volatile storage device in which a cache memory is used for preloading a data segment before the data segment is loaded into a host system. Retrieved data (i.e. data which is requested by the host system) can be divided into ordered data (i.e. data that is arranged in a known and/or "predictable" sequence) and random data. The present invention focuses on retrieving ordered data from storage devices.

Data-retrieval operations from a storage device (e.g. a magnetic-tape recorder) are divided into two main sub-operations:

(1) an internal storage-device data-retrieval stage (hereinafter referred to as a "pre-loading stage"), which occurs upon a host-system request, involves the storage device's internal controller searching for the specific data, and preparing the data to be read by the host system. It is noted that the data is not delivered to the host system during the pre-loading stage.

(2) a host-system data-retrieval stage (hereinafter referred to as a "loading stage"), which occurs when the pre-loading stage is completed, involves the storage device notifying the host system that the data is ready to be read by the host system. Such notification can occur in two ways, such as by answering a host-system question as to whether the data is ready or not, or by invoking an interrupt to the host system, signaling that the data is ready.

Clearly, such data-retrieval operations, typical to all storage devices in the prior art, have a built-in latency which is the time needed for the first sub-operation. This latency does not disturb the host system, and is hardly noticed if the time to process one segment of data is much longer than this latency. However, in some data-retrieval operations (especially in streaming processes such as loading JPEG and MPEG data, for example), the processing time is very short, and the latency of waiting for the storage device to complete the initial pre-loading stage becomes a problem. Moreover, in some applications, it is important that the data in storage be available on demand (e.g. utilizes a "demand-paging mechanism").

It is important to note that proxy servers and cache storage systems known in the prior art do not solve the need described herein, as they are probabilistic and provide faster access based only on considerations that are external to the data itself (e.g. history of retrieval, availability of sectors, and a priori knowledge about future retrieval). The prior art fails to improve the loading time of an arbitrarily-selected data file using any type of predictive approach.

It would be desirable to have methods for predicting with a high probability of success which data segments will be subsequently loaded from a storage device. By applying such a prediction, and preparing the predicted data segment, such systems can save time and increase the efficiency of data retrieval.

It is noted that there are prior-art systems that cache a plurality of data segments for reducing the time of the reading process (e.g. a hard-disk drive that reads all the available sectors upon one revolution of the disk). Such prior art does not solve the need described above, as it applies only to contiguous data objects and to the amount of sectors that can be read in one revolution of the disk.

SUMMARY OF THE INVENTION

It is the purpose of the present invention to provide methods for improving data-retrieval times from a non-volatile storage device in which a cache memory is used for preloading a data segment before the data segment is loaded into a host system.

For the purpose of clarity, several terms which follow are specifically defined for use herein. The term "data segment" is used herein to refer to a unit of data that is written and/or read according to a given protocol as a single unit of data, such that a write-operation and/or read-operation typically writes and/or reads one segment (e.g., a sector in storage). The term "data object" is used herein to refer to a collection of segments having a joint logical meaning (e.g. a file made of sectors). The term "storage device" is used herein to refer to a device configured to be operationally connected to a host system, which activates, initializes, and manages the storage device. A storage device provides data to the host system (e.g., data input and read-operations) and/or retrieves data from the host system (e.g. data output and write-operations).

The term "data sequence" is used herein to refer to an index of logical segments of a data object in a storage device (e.g. bits, bytes, sectors, segments, units, and blocks), indicating the order of the data in the storage device, and enabling the prediction of the logical address of a next segment while using a current segment. The term "predictable sequence" is used herein to refer to a set of data segments that are to be read in a specific order. In some embodiments of the present invention, the specific order is provided to the storage device by the host system. Alternatively, the specific order is derived by the storage device from information that is either in the data object, or is provided by the host system upon starting a read-operation.

The term "data-retrieval time" is used herein to refer to the time for performing a data-object loading process. In the present invention, a process in which segment-by-segment preloading operations are performed during the loading makes the process faster than a similar process lacking such segment-by-segment preloading operations, thereby improving data-retrieval times. The term "contiguous data object" is used herein to refer to a data object made of segments having contiguous addresses. The term "non-contiguous data object" is used herein to refer to a data object made of segments having non-contiguous addresses.

The term "diluted data object" is used herein to refer to a data object having data segments that are excluded from being preloaded in a predictive manner according to the present invention. The terms "diluted formula" and "diluted algorithm" are used herein to refer to a formula and algorithm, respectively, which are used to predict the next data segment, from the data segments that are not excluded from a diluted data object, to be preloaded according to the present invention.

The present invention teaches methods for identifying sequences of non-contiguous data objects that are requested by a host system from a storage device, and using such sequences to prepare the next data segment for reading while the current segment is being processed. Such methods eliminate the latency of the pre-loading stage, making the next segment available to the host system on demand.

A potentially redundant step exists if a pre-loaded segment is not requested by the host system. The present invention assumes that the next segment will actually be required by the host system; however, it is possible that the next pre-loaded segment will not be requested (e.g. if a host application aborts the loading process). In such a case, the time lost unnecessarily in performing the segment pre-loading is minimal.

It is the purpose of the present invention to teach faster transfer of non-contiguous data segments from a storage device to a host system (or to another storage device) by predicting the next segments to be needed by the host system before the segments are actually requested.

While the segments are requested in random order in some applications, making it difficult to predict the next segment to be requested, in other applications (e.g. playing music, displaying images, and running program-code sequences), there are sets of segments that are always retrieved in sequence (e.g. data objects). Since segments are typically stored in a non-contiguous manner, the retrieval of non-contiguous data objects involves some latency.

In the present invention, the controller of the storage device detects predictable sequences to be loaded, and pre-loads the next segment, based on information about the identity of the next segment. There are several alternative ways for the controller of the storage device to determine if a data object to be retrieved should be retrieved as a predictable data object. The embodiments below are classified in Table 1 according to the "next-segment determination" criteria of the entity that determines the next segment (i.e. host system or storage device), and of the time of the determination (i.e. upon a write-operation or upon a read-operation).

handled as predictable, and the storage device uses the information to handle the data object as predictable upon retrieval (i.e. that the storage device will determine the address of the next segment to be read, and "cache" the segment (i.e. send the segment to cache memory) upon delivery of the current segment).

In another preferred embodiment of the present invention (see Table 1, [1B] (i)), the host system prescribes to the storage device, upon reading a segment in the storage device, the identity of the segment that should follow the current segment upon reading. The storage device follows the host-system instruction upon reading, and handles the data object as predictable.

In another preferred embodiment of the present invention (see Table 1, [2A](i-iii)), the controller of the storage device, upon writing the data object, recognizes that the data object is predictable (based on data-object name, extension, or content) as follows:

(i) Based on filename: The storage device identifies data-object type (predictable or non-predictable) by the data-object name (e.g. filename). For example, there are filenames that start with specific strings that indicate the type of file. According to the file type, the storage device recognizes if the file type follows a predictable sequence or not. A prior-art example is JPEG files created by a digital camera, and stored with the filenames IMG0.JPG, IMG1.JPG, IMGXXX.JPG.

(ii) Based on file extension: The storage device identifies the data object type (predictable or non-predictable) by file extension. For example, the extension of a filename sometimes indicates the type of file. According to the file type, the storage device recognizes if the file type follows a predictable sequence or not. A prior-art example is a JPEG file with the extension JPG, or an MPEG file with the extension MPG.

(iii) Based on content format: The storage device identifies the data-object type (predictable or non-predictable) by a unique identification or "signature" included in the file content: A prior-art example is a Windows® CE (or WinCE) image that includes a unique signature, "B000FF" in a specific offset of the file (i.e. data object). According to such a signature, with a specific offset inside the data object, the storage device identifies the data as an executable OS image. There are well-known

TABLE 1

Embodiments of the present invention according to "next-segment determination" criteria.

| | Next segment address determined by host system [1] | Next segment address determined by storage device [2] |
|---|---|---|
| Next segment determined upon a write-operation [A] | (i) Designate data object as predictable<br>(ii) Prescribe, for each segment, the following segment to be read | (i) Recognizes predictable data object by the filename<br>(ii) Recognizes predictable data object by the file extension<br>(iii) Recognizes predictable data object by the file content |
| Next segment determined upon a read-operation [B] | (i) Prescribe to the storage device, upon reading the data object, to read the data object sequentially<br>(ii) Host system specifies, upon reading a segment, the next segment to be read | (i) Storage device determines the next segment to be read according to a formula, provided by the host system, upon reading the data object |

In a preferred embodiment of the present invention (see Table 1, [1A](i-ii)), the host system informs the storage device, upon writing a data object, that the data object is to be industry formats that are identified according to signatures with a specific offset and a "checksum" (in a specific offset from the start of the data object).

In all of the above preferred embodiments, the storage-device controller writes the data object in a way that will enable methods of the present invention to be operative upon reading.

In another preferred embodiment of the present invention (see Table 1, [1B](ii)), the host system informs the storage device, upon reading a data object or a part of a data object, that the data object is to be read as a predictive data object, and the storage device uses the data sequence generated upon writing, to identify the next data segment and cache the next data segment upon delivery of the current segment.

In another embodiment of the present invention (see Table 1, [2B](i)), a host application of the host system prescribes to the storage device, upon reading the data object, a diluted formula or a diluted algorithm that the storage device should use to determine the next data segment in a diluted data object, and the storage device caches and delivers the data segments according to such a formula. An example of an application of such an embodiment is the retrieval of a large image. Such retrieval can be done either sequentially, or by sampling portions of the image (and filling in the missing portions later). Another example of an application of such an embodiment is the retrieval of records from a large database following the completion of a search on the database. The search provides a list of pointers, and the retrieval needs a specified number of segments for each pointer.

In another preferred embodiment of the present invention, the "formula" for the next segment is simply an instruction to "read the segment that follows the current segment." In such a case, the application enables any data structure to be read as a contiguous data object.

In another preferred embodiment of the present invention, the host system, upon reading the data object, arbitrarily specifies along with each read command, a specific identity of the next segment to be read, and the storage device then caches the next segment. In such a case, no formula or algorithm is needed.

When the storage-device controller writes a data object that is known to be predictable, the controller marks the data object as such in one of two alternative embodiments:

(1) the controller maintains a data structure that maps the individual segments of the data object, and recognizes, upon retrieval, which is the next segment in the sequence. Such a data structure can take the form of a pointer, an index, a formula, or any other indication that can predictably point to the next segment. One way to maintain these indices is to use the virtual-to-physical "conversion" data, which reside in mapping tables in all flash-memory storage devices, to maintain the information that applies to each segment of storage. A bit can be added to the segment information to indicate if the relevant segment is predictable. Such an approach to labeling data objects ensures lower storage-memory consumption and better retrieval-time performance compared to managing a separate index for the predictable attribute.

(2) each segment of a predictable data object is associated, upon writing, with a pointer to the next segment in the sequence. Upon retrieval, the controller reads this pointer, and prepares the next segment as described below.

In another preferred embodiment of the present invention, the identity of a "follower segment" is determined statistically by the controller. The controller records the identity of the data segment that is requested following a given data segment. Upon identification of such a data segment, the data segment is designated as the follower data segment of the current data segment, and is predicatively cached each time the current data segment is requested. While there is no guarantee that the follower segment will always be the next data segment requested (as in program code in which a routine can diverge at "if/then" branches causing two or more alternative segment chains), there is an improvement in file-access time due to the statistical probability the data segment being a "frequent follower." This is in contrast to a simple history-of-retrieval approach that tracks the history for data-object retrieval. The present invention predicts the follower segment, not just the next data object.

An essential feature of the present invention is the autonomous execution of the preloading stage of the next data segment by the storage-device controller based on information known to the storage device (from any source) about the expected next request of the host system to retrieve a data segment.

When a data segment is requested by the host system (or by another storage device in a direct memory access (DMA) process), the controller checks if the data segment belongs to a predictable data object. Such a check is performed in either of the two ways described above. If the data segment is found to belong to a predictable data object, then immediately after loading the data segment to the host system, the controller preloads the next data segment in the data object. When the host system requests the next data segment, the controller can deliver the data segment immediately.

Therefore, according to the present invention, there is provided for the first time a method for preloading data to improve data-retrieval times from a non-volatile storage device, the method including the steps of: (a) providing a cache memory for preloading the data upon a host-system request to read the data; (b) determining that a plurality of data segments that constitute a non-contiguous data object, stored in the storage device such that at least one data segment is non-contiguous to a preceding data segment in the data object, are in a predictable sequence; and (c) preloading a non-contiguous next data segment in the predictable sequence into the cache memory after loading a current data segment into a host system from the cache memory, wherein the next data segment is preloaded prior to the host-system request to read the next data segment.

Preferably, the method further includes the step of: (d) storing information about the predictable sequence upon writing of the data object into the storage device.

Preferably, the method further includes the step of: (d) receiving an indication, from the host system, that the data object is a predictable data object.

Most preferably, the indication is provided upon writing the data object into the storage device, or upon reading the data object from the storage device.

Preferably, the method further includes the step of: (d) determining the data object as a predictable data object by examination of properties of the data object.

Most preferably, the properties include at least one property from the group consisting of: a name of the data object, an extension of the data object, and a format of the data object.

Preferably, an identity of the next data segment is determined from at least one item from the group consisting of: a data structure that is external to the data object, a parameter in the current data segment of the data object, a table for converting virtual addresses to physical addresses of the plurality of data segments, a pointer from the current data segment to the next data segment, a host-system designation of the current data segment, and a statistical frequency analysis of data segments that follow the current data segment in previous retrievals of the current data segment.

Preferably, the host-system request includes an identity of the next data segment for preloading into the cache memory.

Preferably, the method further includes the step of: (d) selecting the next data segment for preloading into the cache memory, from the plurality of data segments, using a diluted algorithm or a diluted formula, prior to the host-system request to read the next data segment.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to methods for increasing data-retrieval times from a non-volatile storage device in which a cache memory is used for preloading a data segment before the data segment is loaded into a host system. The principles and operation for increasing data-retrieval times from a non-volatile storage device, according to the present invention, may be better understood with reference to the accompanying description and the drawings.

Figure 1:
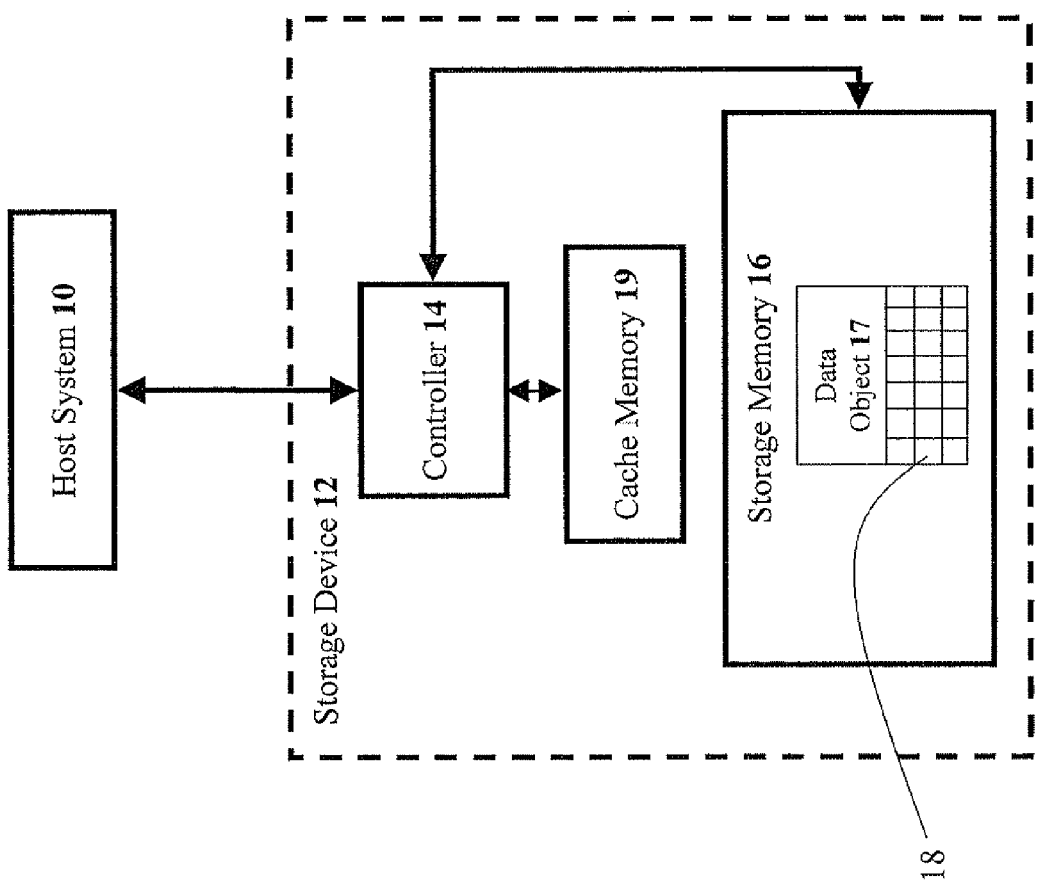
FIG. 1 is a simplified block diagram of a predictable-data-retrieval system, according to a preferred embodiment of the present invention.

Referring now to the drawings, FIG. 1 is a simplified block diagram of a predictable-data-retrieval system, according to a preferred embodiment of the present invention. A host system 10 (e.g. a personal computer or a mobile phone), is shown connected to a storage device 12 (e.g. a USB flash drive (UFD) or a memory card). Storage device 12 has a controller 14 and a non-volatile storage memory 16. Storage memory 16 contains data objects 17 that are made of data segments 18. Storage device 12 also has a cache memory 19 that is typically much faster and smaller than storage memory 16. Upon receiving a data-retrieval request from host system 10, storage device 12 performs a "search" operation, which actually prepares data segments 18 for read-operations on host system 10.

Since the search involves reading indices and/or mapping tables, determining the correct address of data segments 18 according to which data object 17 was read, and loading data segments 17 into cache memory 19, the search will take time to be performed. While the search is being performed, storage device 12 either notifies host system 10 that data object 17 is not ready yet (e.g. via a bit indicating the status as ready/busy), or responds with a failure to the read-operations associated with the data-retrieval request from host system 10. When data object 17 is ready (i.e. storage device 12 found the relevant file, relevant track, or relevant flash-erasable unit), storage device 12 notifies host system 10 that data object 17 is ready to be read (via a ready busy bit or by an interrupt). At this point, host system 10, or another storage device, can read data object 17.

Figure 2:
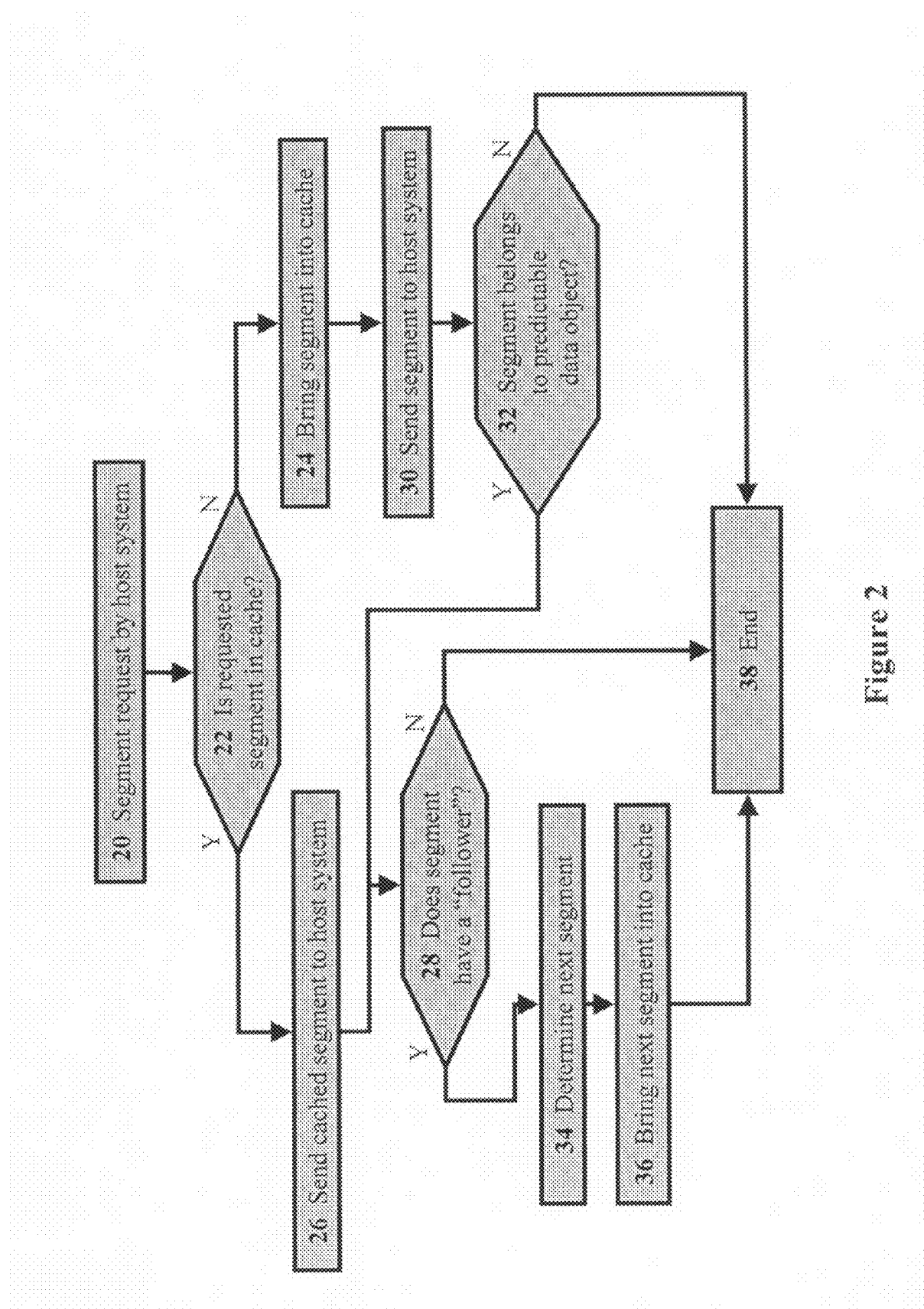
FIG. 2 is a simplified flowchart of the steps in a predictable-data-retrieval process, according to a preferred embodiment of the present invention.

FIG. 2 is a simplified flowchart of the steps in a predictable-data-retrieval process, according to a preferred embodiment of the present invention. Upon receiving a request for a data segment 18 from host system 10 (Step 20), controller 14 determines whether or not the requested data segment 18 is in cache memory 19 (Step 22).

Figure 3:
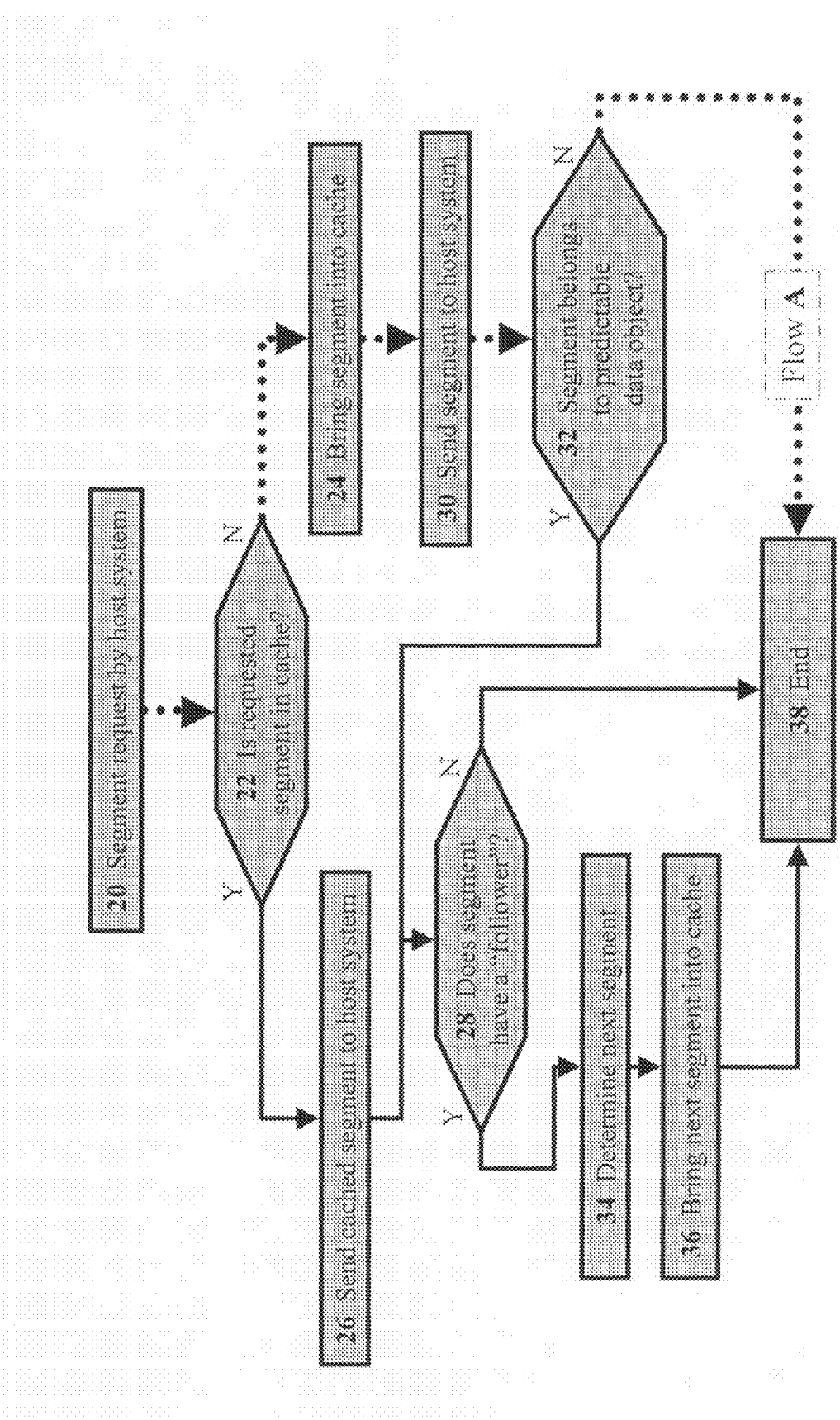
FIG. 3 is a simplified flowchart of the predictable-data-retrieval process of the present invention when the data object is non-predictable (Flow A)

FIG. 3 is a simplified flowchart of the predictable-data-retrieval process of the present invention when the data object is non-predictable (Flow A). Data segments 18 that are not recognized as part of a predictable data object 17 are not read and loaded in cache memory 19 prior to the request of host system 10. If the data segment 18 is not in cache memory 19 already (Step 22), then controller 14 proceeds to load the requested data segment 18 into cache memory 19 (Step 24). Controller 14 then notifies host system 10 that data segment 18 is ready to be read, and automatically sends data segment 18 to host system 10 (Step 30) when host system 10 reads data segment 18, controller 14 checks if the current requested data segment 18 is part of predictable data object 17 (Step 32). If not, then controller 14 ends the read-operation (Step 38).

Figure 4:
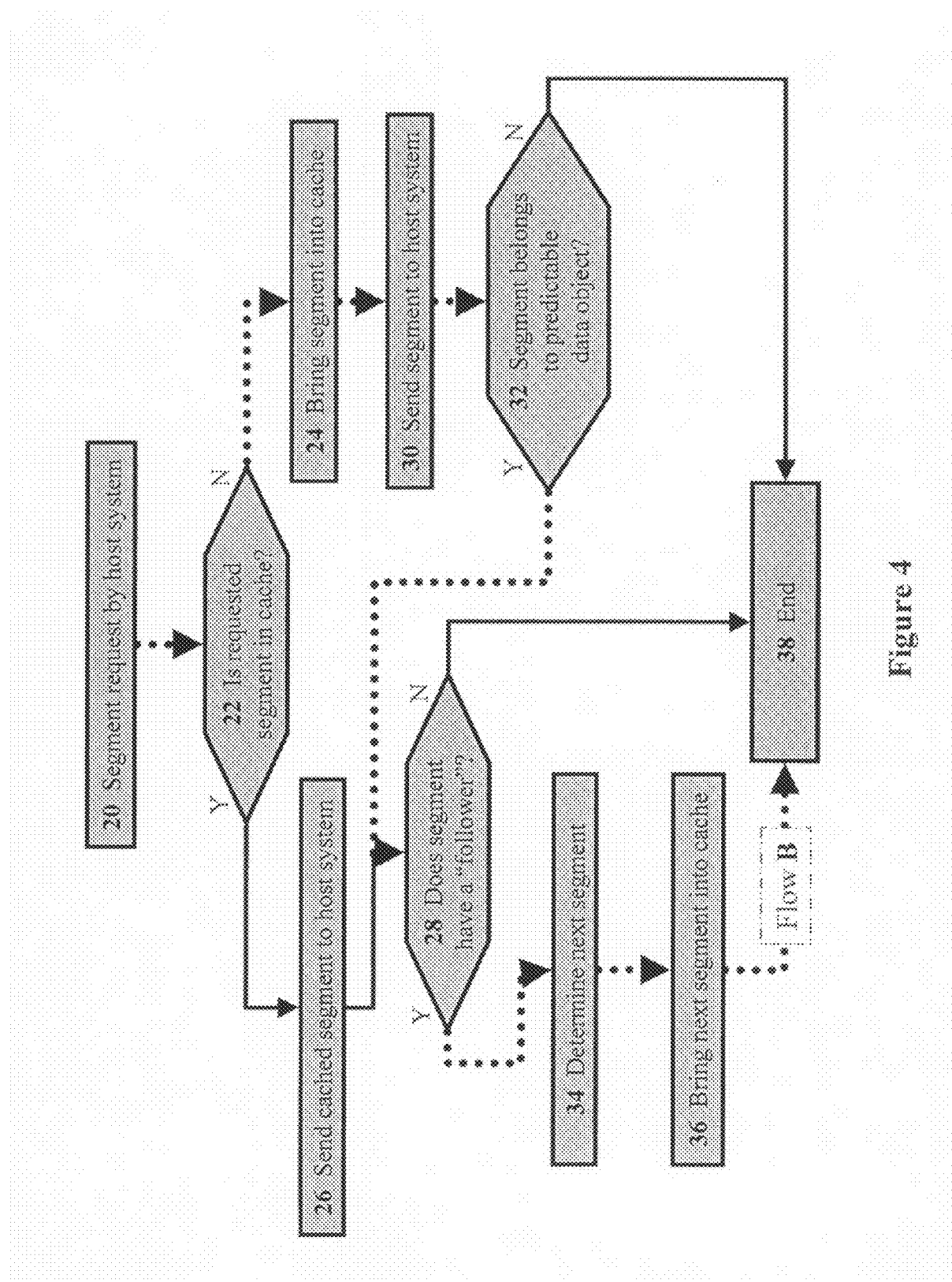
FIG. 4 is a simplified flowchart of the predictable-data-retrieval process of the present invention when the first segment of a predictable data object is being read (Flow B)

FIG. 4 is a simplified flowchart of the predictable-data-retrieval process of the present invention when the first segment of a predictable data object is being read (Flow B). Continuing from Step 32 in the case of a predictable data object 17, if the current data segment 18 is not the last data segment 18 in the sequence of data object 17, controller 14 checks if the current data segment 18 has a "follower segment" (Step 28). If it is the last data segment 18 in the sequence of data object 17, controller 14 proceeds to the end (Step 38). If the data segment 18 is not identified as the last data segment in the sequence of data object 17 (i.e. data segment 18 has a "follower segment"), controller 14 determines the next data segment 18 in the sequence of data object 17 (Step 34), loads the next data segment 18 into cache memory 19 (Step 36), and then proceeds to the end (Step 38).

Figure 5:
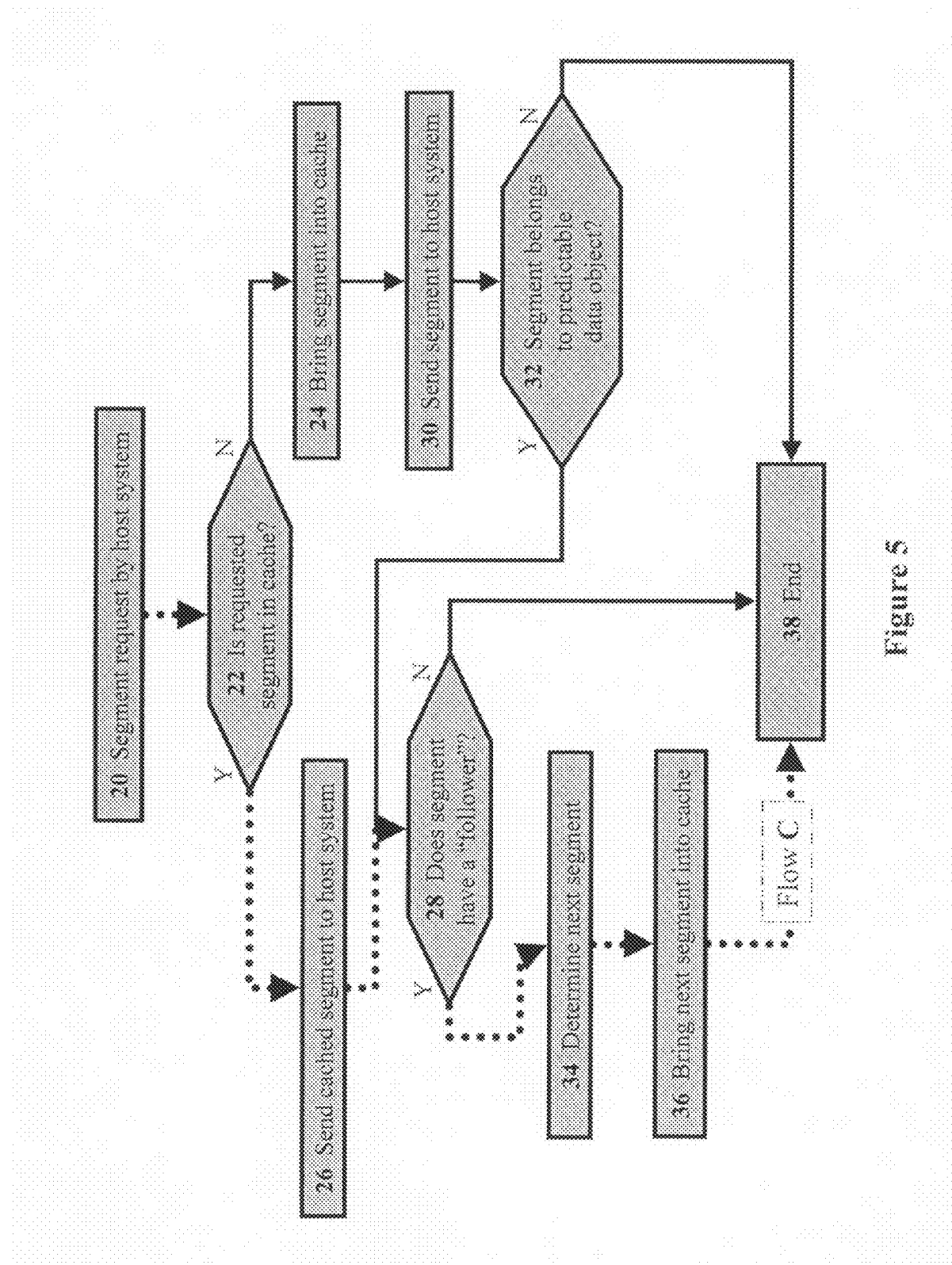
FIG. 5 is a simplified flowchart of the predictable-data-retrieval process of the present invention when a predictable data object is being read (Flow C)

FIG. 5 is a simplified flowchart of the predictable-data-retrieval process of the present invention when a predictable data object is being read (Flow C). In this case, the data segment being retrieved is neither the first nor the last data segment in the data object. Data segments 18 can be loaded into cache memory 19 if data segments 18 are recognized as part of a predictable data object 17, and were read and loaded into cache memory 19 prior to the request from host system 10. If the requested data segment 18 is already in cache memory 19 (Step 22), controller 14 notifies host system 10 that the data is ready to be read, and sends the cached data segment 18 to host system 10 which tries to read the relevant data segment 18 (Step 26). If controller 14 identifies that the current requested data segment 18 is part of predictable data object, it proceeds to check if the current data segment 18 has a "follower segment" (Step 28). If the current data segment 18 is not the last data segment 18 in the data object 17, controller 14 determines the next data segment 18 in the sequence of data object 17 (Step 34), loads the next data segment 18 into cache memory 19 (Step 36), and then ends the read-operation (Step 38).

Figure 6:
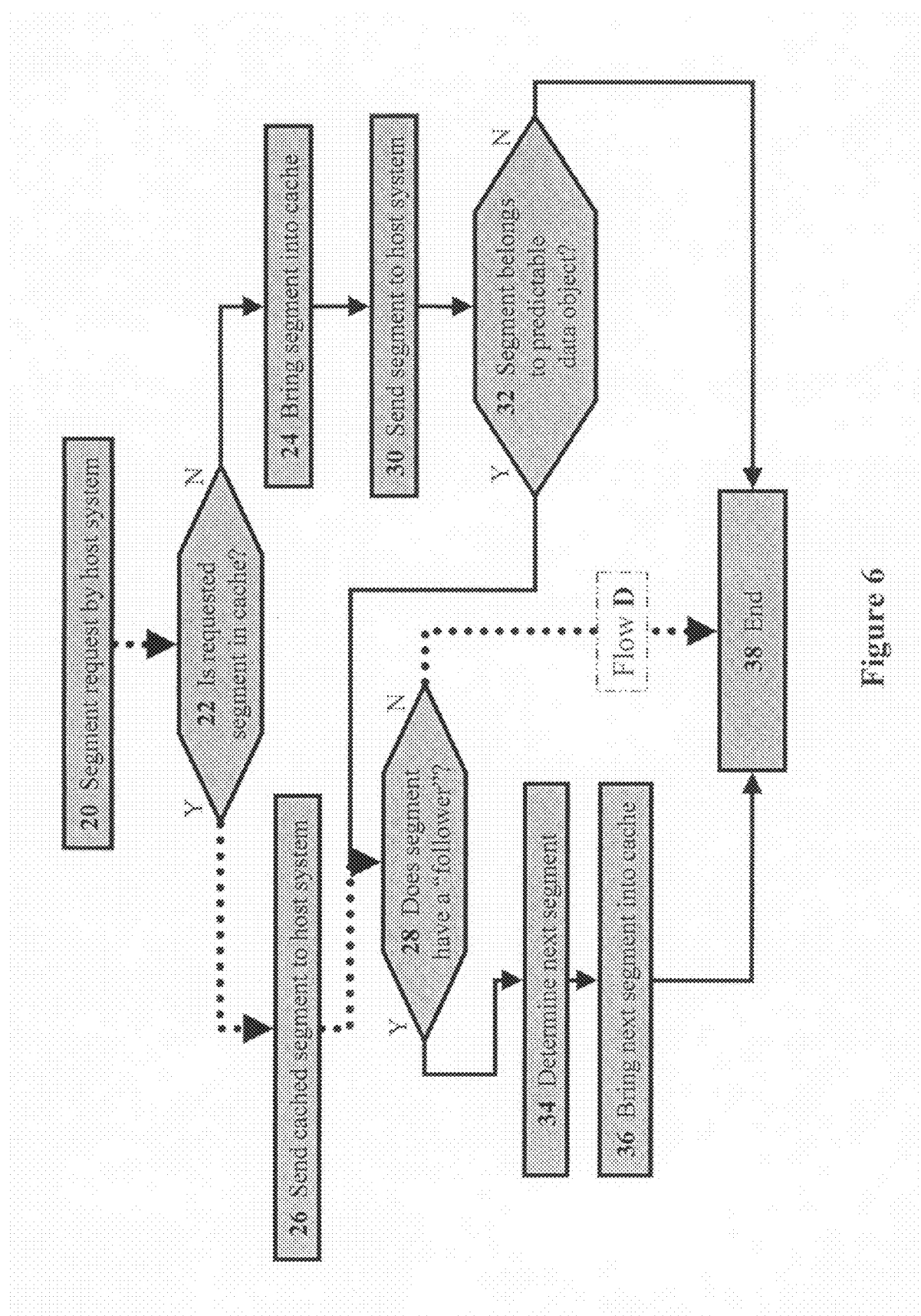
FIG. 6 is a simplified flowchart of the predictable-data-retrieval process of the present invention when the last segment of a predictable data object is being read (Flow D)

FIG. 6 is a simplified flowchart of the predictable-data-retrieval process of the present invention when the last segment of a predictable data object is being read (Flow D). Continuing from Step 28, if the current data segment 18 is the last data segment 18 in the sequence of data object 17, then controller 14 ends the read-operation (Step 38).

Figure 7:
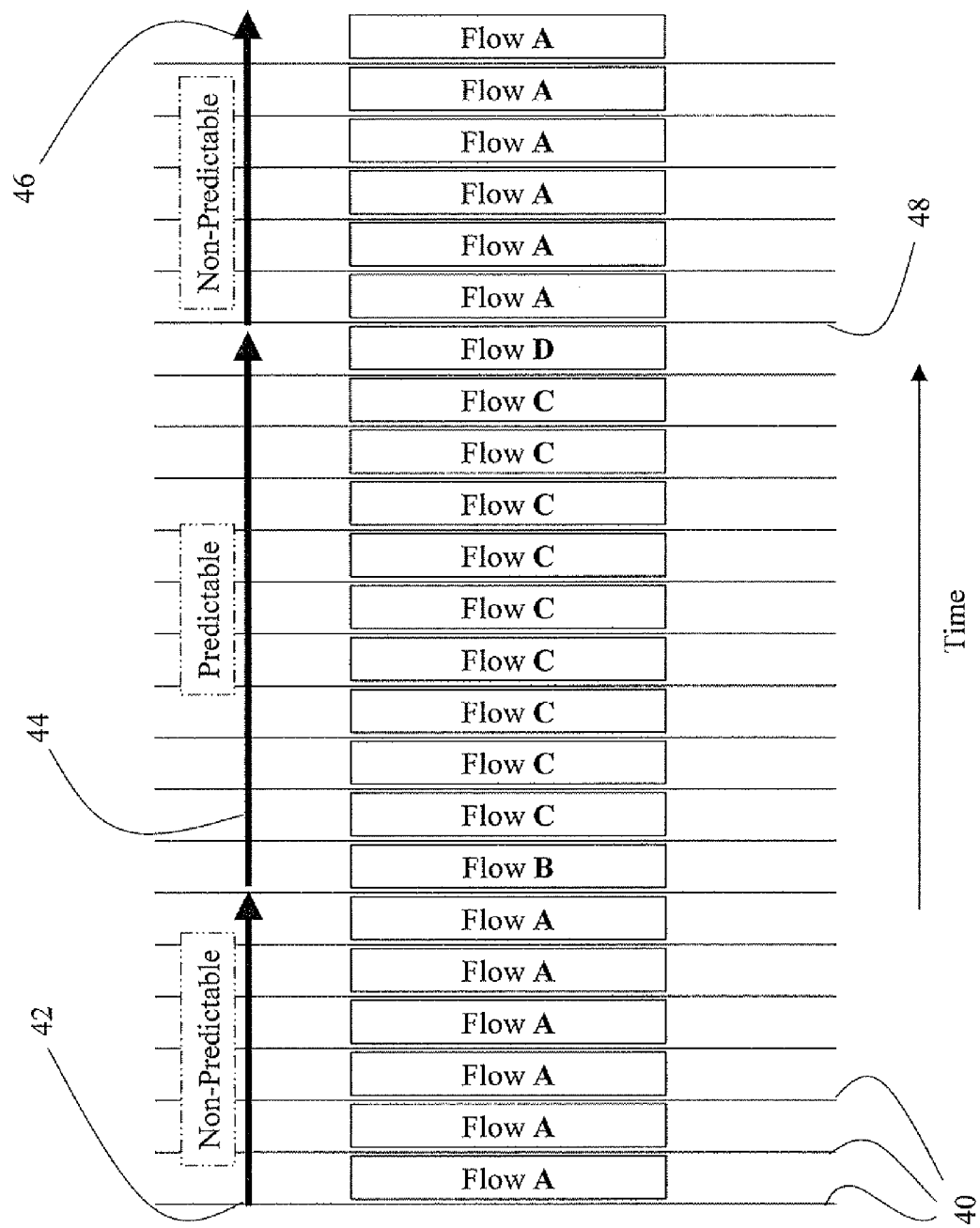
FIG. 7 is a simplified schematic diagram depicting Flows A-D of the process in FIGS. 3-6 as a function of time, according to a preferred embodiment of the present invention.

FIG. 7 is a simplified schematic diagram depicting Flows A-D of the process in FIGS. 3-6 as a function of time, according to a preferred embodiment of the present invention. FIG. 7 illustrates a scenario that involves all four "read-modes" described in FIGS. 3-6. FIG. 7 is divided into a sequence of read-operations 40, labeled as the read-modes of Flows A-D from FIGS. 3-6, of host system 10. Three data objects 42, 44, and 46 are being read in consecutive order. Data objects 42 and 46 are non-predictable, and data object 44 is predictable. By way of example, the last read-operation 40 of predictable data object 44 is indicated by a read-operation 48, and is read using Flow D of FIG. 6.

While the invention has been described with respect to a limited number of embodiments, it will be appreciated that many variations, modifications, and other applications of the invention may be made.

What is claimed is:

1. A method comprising:
in a data storage device that is detachable from and operatively coupled to a host device, wherein the data storage device includes a controller, a cache memory attached to the controller via a first data path, and a storage memory attached to the controller via a second data path, wherein the first data path is different than the second data path, performing:
sending a first data segment of a data object to the host device;
after sending the first data segment to the host device, receiving an indication from the host device that the data object has a predictable data object type; and
after receiving the indication from the host device and prior to receiving a request from the host device for a second data segment:
identifying, in the data storage device, that the first data segment associated with the data object and the second data segment associated with the data object are sequential in a predictable sequence, wherein the second data segment is non-contiguous in relation to the first data segment; and
in response to identifying the second data segment as being sequential to the first data segment, autonomously preloading the second data segment from the storage memory into the cache memory to be available for access by the host device.

2. The method of claim 1, wherein the second data segment is determined from a parameter in the first data segment of the data object.

3. The method of claim 1, further comprising selecting the second data segment using at least one of a diluted algorithm and a diluted formula.

4. The method of claim 1, wherein a format of the data object comprises a unique bit pattern that identifies a data file type.

5. The method of claim 1, wherein the cache memory comprises a common area configured to save write data that is sent from the host device, to save read data that is sent to the host device, and to save the preloaded second data segment.

6. The method of claim 1, wherein the second data segment is determined from a statistical frequency analysis of historical data associated with previously retrieved second data segments.

7. The method of claim 1, further comprising receiving from the host device an instruction that prescribes a method of determining a prefetch order of the data segments, and prefetching the data segments to the cache memory according to the prescribed method.

8. The method of claim 7, wherein the instruction is used by the data storage device to predict a next data segment of the data object from among other data segments of the data object that are excluded from being preloaded, wherein the instruction is based on a data object type of the data object.

9. The method of claim 8, wherein the data object type is an image, wherein the instruction is used by the data storage device to sample portions of the image, and wherein non-sampled portions of the image are retrieved by the data storage device after the sampled portions to fill in missing portions of the image.

10. The method of claim 8, wherein the data object type is a database, and wherein the instruction is executable to retrieve records of the database following completion of a search of the database.

11. The method of claim 1, wherein the data storage device is a universal serial bus (USB) flash drive.

12. The method of claim 1, wherein the data storage device is a memory card.

13. A storage device that is detachable from a host device, the storage device comprising:
a storage area comprising a non-volatile memory;
a cache memory; and
a controller coupled to the cache memory via a first data path and coupled to the non-volatile memory via a second data path, wherein the first data path is different than the second data path, wherein while the storage device is operatively coupled to the host device, the controller is configured to:
send a first data segment of a data object to the host device;
after sending the first data segment to the host device, receive an indication from the host device that the data object has a predictable data object type; and
after receiving the indication from the host device and prior to receiving a request from the host device for a second data segment:
identify, in the storage device, that the first data segment associated with the data object and the second data segment associated with the data object are sequential in a predictable sequence, wherein the second data segment is non-contiguous in relation to the first data segment; and
in response to identifying the second data segment as being sequential to the first data segment, autonomously preload the second data segment from the non-volatile memory into the cache memory to be available for access by the host device.

14. The storage device of claim 13, wherein the second data segment is determined from a statistical frequency analysis of historical data associated with previously retrieved second data segments.

15. The storage device of claim 13, wherein a format of the data object comprises a unique bit pattern that identifies the data object type.

16. The storage device of claim 13, wherein the controller is further configured to receive from the host device an instruction that prescribes a method of determining a prefetch order of the data segments and to prefetch the data segments to the cache memory according to the prescribed method.

17. The storage device of claim 16, wherein the instruction is used by the storage device to predict a next data segment of the data object from among other data segments of the data object that are excluded from being preloaded, wherein the instruction is based on a data object type of the data object.

18. The storage device of claim 17, wherein the data object type is an image, wherein the instruction is used by the storage device to sample portions of the image, and wherein non-sampled portions of the image are retrieved by the storage device after the sampled portions to fill in missing portions of the image.

19. The storage device of claim 17, wherein the data object type is a database, and wherein the instruction is executable to retrieve records of the database following completion of a search of the database.

20. The storage device of claim 13, wherein the storage device is a universal serial bus (USB) flash drive.

21. The storage device of claim 13, wherein the storage device is a memory card.

\* \* \* \* \*